(12) United States Patent
Heo

(10) Patent No.: US 10,385,495 B2
(45) Date of Patent: Aug. 20, 2019

(54) CONTROL METHOD OF LAUNDRY TREATMENT APPARATUS

(71) Applicant: LG Electronics Inc., Seoul (KR)

(72) Inventor: Kwangchul Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 15/552,700

(22) PCT Filed: Feb. 22, 2016

(86) PCT No.: PCT/KR2016/001715
§ 371 (c)(1),
(2) Date: Aug. 22, 2017

(87) PCT Pub. No.: WO2016/137182
PCT Pub. Date: Sep. 1, 2016

(65) Prior Publication Data
US 2018/0030637 A1    Feb. 1, 2018

(30) Foreign Application Priority Data

Feb. 23, 2015 (KR) .......................... 10-2015-0025105

(51) Int. Cl.
*D06F 33/02* (2006.01)
*D06F 39/04* (2006.01)
(Continued)

(52) U.S. Cl.
CPC ............ *D06F 33/02* (2013.01); *D06F 29/005* (2013.01); *D06F 37/12* (2013.01); *D06F 37/304* (2013.01);
(Continued)

(58) Field of Classification Search
CPC .......... D06F 33/02; D06F 39/04; D06F 58/02; D06F 29/005; D06F 37/12; D06F 37/304;
(Continued)

(56) References Cited

U.S. PATENT DOCUMENTS 3,824,813 A    7/1974   Davis
8,051,685 B2 * 11/2011   Kim ........................ D06F 33/02
                                                                68/12.02
(Continued)

FOREIGN PATENT DOCUMENTS

KR   10-1991-0006790    9/1991
KR   10-0201-0065084    7/2001
(Continued)

OTHER PUBLICATIONS

International Search Report and Written Opinion in International Application No. PCT/KR2016/001715, dated May 31, 2016, 9 pages (with English translation).

(Continued)

*Primary Examiner* — Charles R Kasenge
(74) *Attorney, Agent, or Firm* — Fish & Richardson P.C.

(57) ABSTRACT

A control method of a laundry treatment apparatus that includes a first treatment device that has a first load unit and that is configured to treat laundry and a second treatment device that has a second load unit and that is configured to treat laundry includes the action of executing a first cycle in the first treatment device by supplying electric power to the first load unit. The actions include executing a second cycle in the second treatment device by supplying electric power to the second load unit. The actions further include reducing power consumption by terminating the second cycle in the second treatment device and executing a third cycle in the second treatment device, the third cycle being different than the second cycle. The actions further include terminating the first cycle in the first treatment device. The actions further include terminating the third cycle in the second treatment device.

20 Claims, 3 Drawing Sheets

(51) Int. Cl.
*D06F 58/28* (2006.01)
*D06F 37/30* (2006.01)
*D06F 58/02* (2006.01)
*D06F 29/00* (2006.01)
*D06F 37/12* (2006.01)
*G05B 19/042* (2006.01)
*D06F 25/00* (2006.01)

(52) U.S. Cl.
CPC .............. *D06F 39/04* (2013.01); *D06F 58/02* (2013.01); *D06F 58/28* (2013.01); *G05B 19/042* (2013.01); *D06F 25/00* (2013.01); *D06F 29/00* (2013.01); *D06F 2058/2854* (2013.01); *D06F 2058/2883* (2013.01); *D06F 2058/2896* (2013.01); *D06F 2202/12* (2013.01); *D06F 2204/10* (2013.01); *D06F 2210/00* (2013.01); *D06F 2216/00* (2013.01); *D06F 2220/00* (2013.01); *G05B 2219/2639* (2013.01)

(58) Field of Classification Search
CPC .. D06F 58/28; D06F 2216/00; D06F 2210/00; D06F 2220/00; D06F 2058/2854; D06F 29/00; D06F 25/00; D06F 2058/2883; D06F 2058/2896; D06F 2204/10; D06F 2202/12; G05B 19/042; G05B 2219/2639
See application file for complete search history.

(56) References Cited

U.S. PATENT DOCUMENTS

| | | | | |
|---|---|---|---|---|
| 9,200,401 | B2* | 12/2015 | Chung | ................... D06F 33/02 |
| 10,087,572 | B2* | 10/2018 | Bilionis | ................... D06F 58/28 |
| 2006/0117491 | A1 | 6/2006 | Kim | |
| 2010/0037659 | A1* | 2/2010 | Kim | ...................... D06F 33/02 68/12.01 |
| 2011/0041258 | A1 | 2/2011 | Ko et al. | |
| 2014/0082958 | A1* | 3/2014 | Chung | ................... D06F 33/02 34/319 |
| 2018/0230640 | A1* | 8/2018 | Bilionis | ................... D06F 58/28 |

FOREIGN PATENT DOCUMENTS

| | | |
|---|---|---|
| KR | 10-2008-0010047 | 1/2008 |
| KR | 10-2010-0099977 | 9/2010 |
| KR | 10-2013-0127046 | 11/2013 |
| WO | WO2011057955 | 5/2011 |

OTHER PUBLICATIONS

European Extended Search Report in European Application No. 16755832.9, dated Jun. 18, 2018, 7 pages.

* cited by examiner

[Fig. 1]
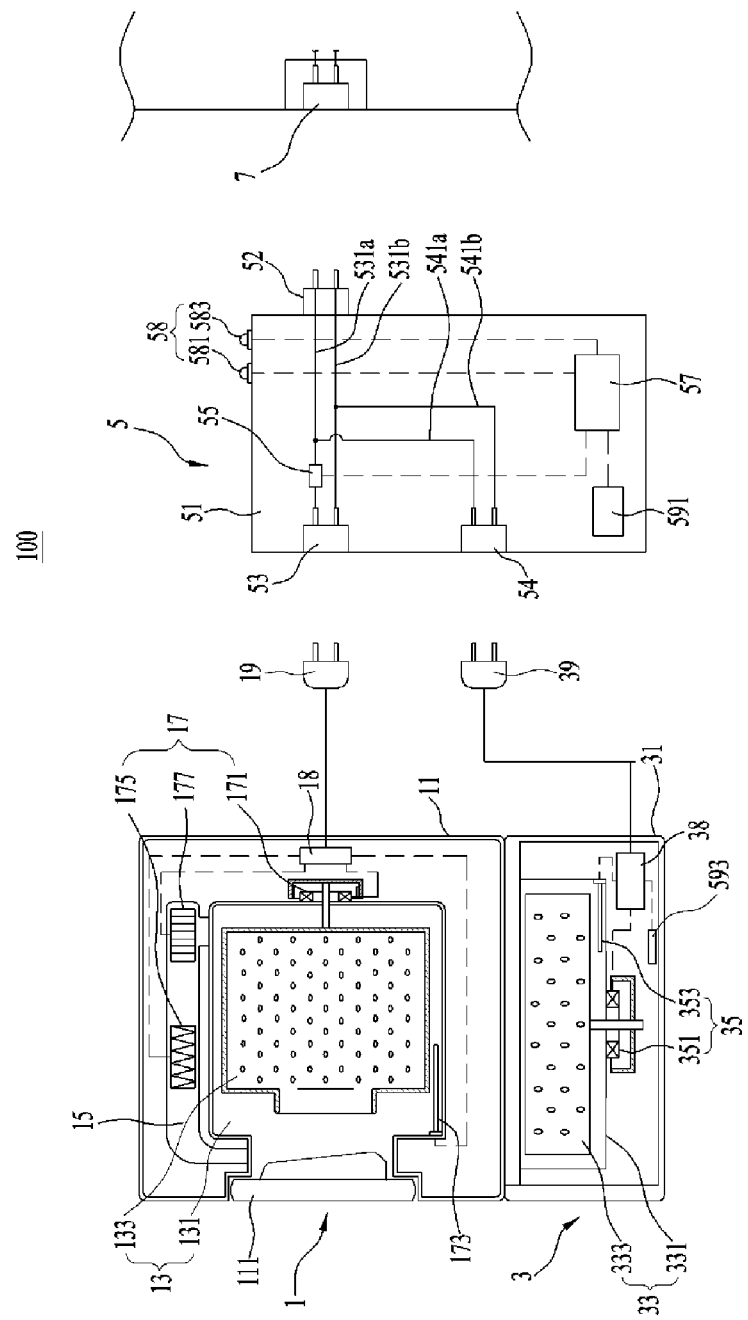

[Fig. 2]
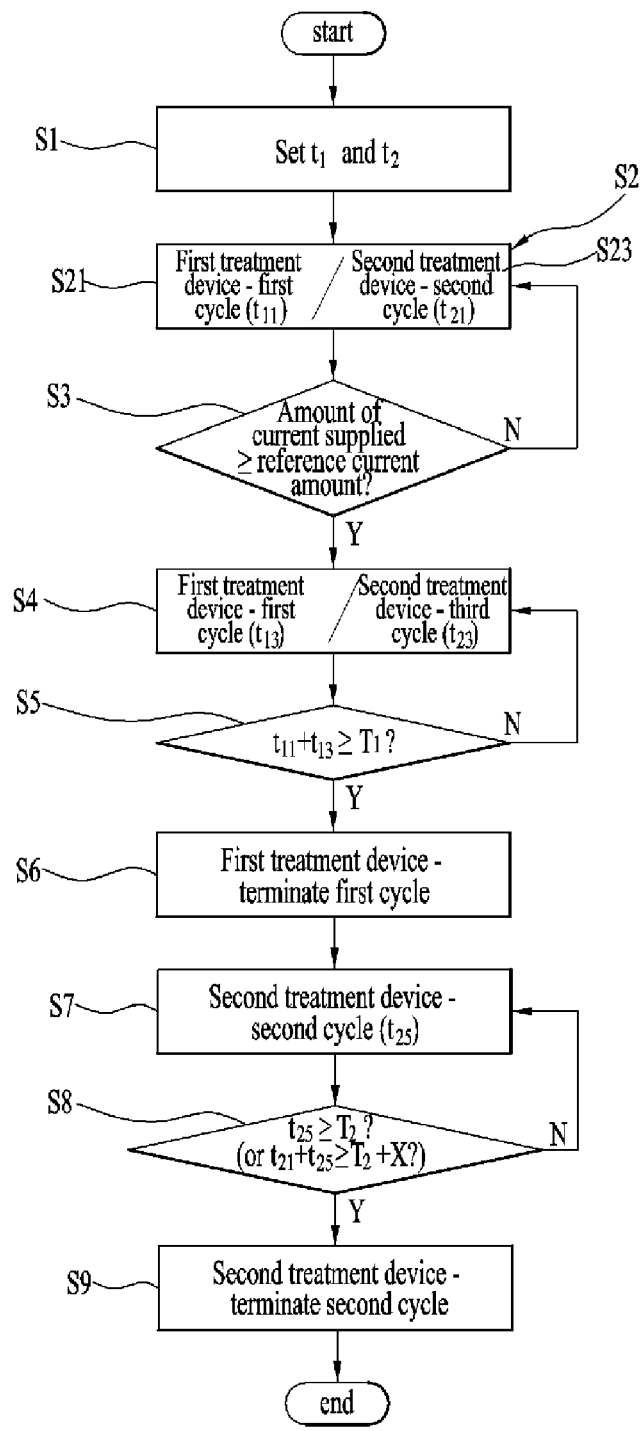

[Fig. 3]
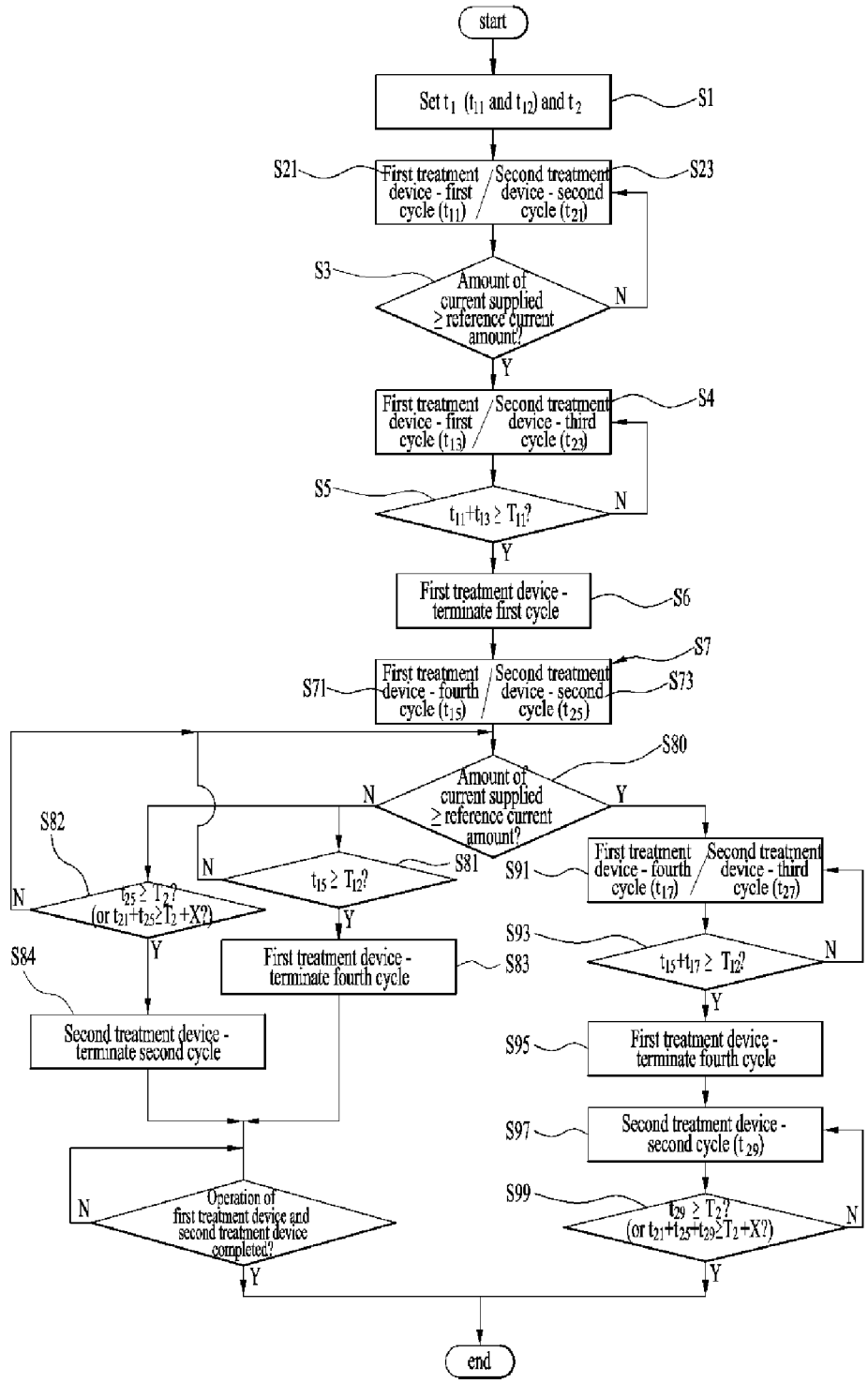

CONTROL METHOD OF LAUNDRY TREATMENT APPARATUS

CROSS-REFERENCE TO RELATED APPLICATIONS

This application is a National Stage application under 35 U.S.C. § 371 of International Application No. PCT/KR2016/001715, filed Feb. 22, 2016, which claims the benefit of Korean Application No. 10-2015-0025105, filed on Feb. 23, 2015. The disclosures of the prior applications are incorporated by reference in their entirety.

TECHNICAL FIELD

The present disclosure relates to a control method of a laundry treatment apparatus.

BACKGROUND ART

In general, a laundry treatment apparatus is a concept including an apparatus for washing laundry, an apparatus for drying laundry, and an apparatus for washing and drying laundry.

In a front loading type laundry treatment apparatus (for example, a drum type washing machine), in which laundry is introduced into the laundry treatment apparatus through the front thereof, an introduction port, through which laundry is introduced into the laundry treatment apparatus, is lower than the waist of a user, with the result that the user must stoop to introduce laundry into the laundry treatment apparatus or to remove laundry from the laundry treatment apparatus.

DISCLOSURE OF INVENTION

Technical Problem

An object of the subject matter described in this application lies in a control method of a laundry treatment apparatus including at least two treatment devices (for example, a dryer, a washer, a washer and dryer, etc.) for treating laundry.

Another object of the subject matter described in this application lies in a control method of a laundry treatment apparatus that is capable of preventing the operation of a first treatment device and a second treatment device for treating laundry from being simultaneously interrupted due to overcurrent when the two treatment devices are operated simultaneously.

Solution to Problem

According to an innovative aspect of the subject matter described in this application a control method of a laundry treatment apparatus includes a first treatment device that has a first load unit and that is configured to treat laundry and a second treatment device that has a second load unit and that is configured to treat laundry, the control method includes the actions of executing a first cycle in the first treatment device by supplying electric power to the first load unit; while executing the first cycle in the first treatment device, executing a second cycle in the second treatment device by supplying electric power to the second load unit; based on an amount of current per unit time that is supplied to the laundry treatment apparatus being equal to or greater than a predetermined reference current amount, terminating the second cycle in the second treatment device and executing a third cycle in the second treatment device, the third cycle requiring a lower amount of current per unit time than that necessary to execute the second cycle; terminating the first cycle in the first treatment device; terminating the third cycle in the second treatment device and repeating the second cycle in the second treatment device; terminating the repeated second cycle in the second treatment device based on the repeated second cycle in the second treatment device executing for at least a predetermined second cycle reference time; a sum of an execution time of the second cycle in the second treatment device and an execution time of the repeated second cycle in the second treatment device being equal to or greater than the predetermined second cycle reference time; or the sum of the execution time of the second cycle in the second treatment device and the execution time of the repeated second cycle in the second treatment device being equal to or greater than a sum of a predetermined additional time and the predetermined second cycle reference time.

The control method may include one or more of the following optional features. The actions further include setting the predetermined second cycle reference time before executing the second cycle in the second treatment device. The predetermined additional time is proportional to an execution time of the third cycle in the second treatment device or inversely proportional to an execution time of the second cycle in the second treatment device. The actions further include after terminating the first cycle in the first treatment device and while repeating the second cycle in the second treatment device, repeating the first cycle in the first treatment device or executing a fourth cycle that is different from the first cycle in the first treatment device. The actions further include based on the amount of current per unit time that is supplied to the laundry treatment apparatus being equal to or greater than the predetermined reference current amount (i) during execution of the repeated second cycle in the second treatment device and (ii) during execution of the repeated first cycle in the first treatment device or execution of the fourth cycle terminating the repeated second cycle in the second treatment device; and repeating the third cycle in the second treatment device.

The actions further include terminating the repeated first cycle in the first treatment device or the fourth cycle; and terminating the repeated third cycle in the second treatment device and executing a second repetition of the second cycle in the second treatment device. The actions further include terminating the second repetition of the second cycle in the second treatment device based on the second repetition of the second cycle in the second treatment device executing for at least the predetermined second cycle reference time. The actions further include terminating the second repetition of the second cycle in the second treatment device based on a sum of the execution time of the second cycle in the second treatment device, the execution time of the repeated second cycle in the second treatment device, and the execution time of the second repetition of the second cycle in the second treatment device is at least the predetermined second cycle reference time. The actions further include terminating the second repetition of the second cycle in the second treatment device based on a sum of the execution time of the second cycle in the second treatment device, the execution time of the repeated second cycle in the second treatment device, and the execution time of the second repetition of the second cycle in the second treatment device is at least a sum of a predetermined additional time and the predetermined second cycle reference time.

The additional time is proportional to one of an execution time of the third cycle in the second treatment device or an execution time of the repeated third cycle in the second treatment device. The additional time is inversely proportional to one of the execution time of the second cycle in the second treatment device or the execution time of the repeated second cycle in the second treatment device. The amount of current per unit time that is supplied to the laundry treatment apparatus is an amount of current per unit time that is supplied to the first treatment device. The reference current amount is one of an amount of current per unit time necessary for a first heat exchange unit that is located in the first load unit to heat a fluid, or an amount of current per unit time necessary for a second heat exchange unit that is located in the first load unit to heat a gas. The amount of current per unit time that is supplied to the laundry treatment apparatus is a sum of an amount of current per unit time that is supplied to the first treatment device and an amount of current per unit time that is supplied to the second treatment device. The first treatment device is configured to treat a heavier load of laundry than the second treatment device. The first cycle in the first treatment device and the second cycle in the second treatment device begin execution at different times. The first cycle in the first treatment device and the second cycle in the second treatment device begin execution simultaneously.

The action of terminating the repeated second cycle in the second treatment device occurs based on the repeated second cycle in the second treatment device executing for at least the predetermined second cycle reference time. The action of terminating the repeated second cycle in the second treatment device occurs based on the sum of the execution time of the second cycle in the second treatment device and the execution time of the repeated second cycle in the second treatment device being equal to or greater than the predetermined second cycle reference time. The action of terminating the repeated second cycle in the second treatment device occurs based on the sum of the execution time of the second cycle in the second treatment device and the execution time of the repeated second cycle in the second treatment device being equal to or greater than a sum of the predetermined additional time and the predetermined second cycle reference time.

The object of the present invention can be achieved by providing a control method of a laundry treatment apparatus including a first treatment device having a first load unit for treating laundry and a second treatment device having a second load unit for treating laundry, the control method including supplying electric power to the first load unit to execute a first cycle set in the first treatment device (a first step), supplying electric power to the second load unit to execute a second cycle set in the second treatment device (a second step), the second step being performed during performance of the first step, when the amount of current per unit time that is supplied to the laundry treatment apparatus is equal to or greater than a predetermined reference current amount, terminating the second step and executing a third cycle set in the second treatment device so as to consume a lower amount of current than an amount of current per unit time necessary to execute the second cycle (a third step), terminating the first cycle of the first treatment device (a fourth step), and terminating the third step and executing the second cycle of the second treatment device (a fifth step), wherein the fifth step is terminated when the execution time of the second cycle in the fifth step reaches a predetermined second cycle reference time, when the sum of the execution time of the second cycle in the second step and the execution time of the second cycle in the fifth step reaches the second cycle reference time, or when the sum of the execution time of the second cycle in the second step and the execution time of the second cycle in the fifth step reaches a time obtained by adding a predetermined additional time to the second cycle reference time.

The control method may further include setting the second cycle reference time before performing the second step.

The additional time may be set so as to be proportional to the performance time of the third step or to be inversely proportional to the performance time of the second step.

The control method may further include resuming the first cycle of the first treatment device or executing a fourth cycle, which is set differently from the first cycle, (a sixth step), the sixth step being commenced after completing the fourth step and being performed during performance of the fifth step.

The control method may further include terminating the fifth step and executing the third cycle of the second treatment device when the amount of current per unit time that is supplied to the laundry treatment apparatus is equal to or greater than the reference current amount during performance of the fifth step and the sixth step (a seventh step).

The control method may further include terminating the sixth step (an eighth step) and terminating the seventh step and executing the second cycle of the second treatment device (a ninth step).

The ninth step may be terminated when the continuous execution time of the second cycle in the ninth step reaches the second cycle reference time.

The ninth step may be terminated when the sum of the execution time of the second cycle in the second step, the execution time of the second cycle in the fifth step, and the execution time of the second cycle in the ninth step reaches the second cycle reference time.

The ninth step may be terminated when the sum of the execution time of the second cycle in the second step, the execution time of the second cycle in the fifth step, and the execution time of the second cycle in the ninth step reaches a time obtained by adding a predetermined additional time to the second cycle reference time.

The additional time may be set so as to be proportional to at least one selected from between the performance time of the third step and the performance time of the seventh step or to be inversely proportional to at least one selected from between the performance time of the second step and the performance time of the fifth step.

Whether the amount of current per unit time that is supplied to the laundry treatment apparatus is equal to or greater than the reference current amount may be determined by determining whether the amount of current per unit time that is supplied to the first treatment device is equal to or greater than the reference current amount.

The reference current amount may be set as one selected from between the amount of current per unit time necessary to operate a first heat exchange unit provided in the first load unit in order to heat a fluid and the amount of current per unit time necessary to operate a second heat exchange unit provided in the first load unit in order to heat a gas.

Whether the amount of current per unit time that is supplied to the laundry treatment apparatus is equal to or greater than the reference current amount may be determined by determining whether the sum of the amount of current per unit time that is supplied to the first treatment device and the amount of current per unit time that is supplied to the second treatment device is equal to or greater than the reference current amount.

The weight of the laundry that can be treated by the first treatment device may be higher than that of the laundry that can be treated by the second treatment device.

The first step and the second step may be commenced simultaneously, or one selected from between the first step and the second step may be commenced earlier than the other.

Advantageous Effects of Invention

The subject matter described above provides a control method of a laundry treatment apparatus including at least two treatment devices (for example, a dryer, a washer, a washer and dryer, etc.) for treating laundry.

In addition, the subject matter described above provides a control method of a laundry treatment apparatus that is capable of preventing the operation of a first treatment device and a second treatment device for treating laundry from being simultaneously interrupted due to overcurrent even when the two treatment devices are operated simultaneously.

BRIEF DESCRIPTION OF DRAWINGS

FIG. 1 is a view of an example laundry treatment apparatus.

FIG. 2 is a view of an example control method of a laundry treatment apparatus.

FIG. 3 is a view of an example control method of a laundry treatment apparatus.

BEST MODE FOR CARRYING OUT THE INVENTION

FIG. 1 illustrates an example laundry treatment apparatus.

A laundry treatment apparatus 100 includes a first treatment device 1 for treating (for example, washing, drying, or washing and drying) laundry, a second treatment device 3 for providing an additional laundry treatment space that is separate from the first treatment device 1, and an electric power control device 5 for controlling electric power that is supplied to the first treatment device 1 and the second treatment device 3.

The first treatment device 1 includes a first cabinet 11 forming the external appearance thereof and a first receiving unit 13 defined in the first cabinet 11 for providing a laundry treatment space.

The first receiving unit 13 may include a first tub 131 for providing a water storage space and a first drum 133 provided in the first tub 131 for receiving laundry.

The first tub 131 and the first drum 133 communicate with an introduction port provided in the first cabinet 11. The introduction port is opened and closed by a door 111.

In the first tub 131 may be provided a first heat exchange unit 173 for heating wash water. Outside the first tub 131 may be provided a motor 171 for rotating the first drum 133.

A load (a first load unit) 17 of the first treatment device 1 having the above-described structure is constituted by the motor 171 and the first heat exchange unit 173 (here, "load" refers to an object to which electric power from a power supply is supplied).

In some implementations, the first treatment device 1 is configured as a device that is also capable of drying laundry, and a duct 15 for supplying heated air to the first tub 131 may be provided in the first cabinet 11.

In some implementations the duct 15 is configured as a flow channel for circulating air in the first tub 131, and a second heat exchange unit 175 and a fan 177 may be provided in the duct 15.

The second heat exchange unit 175 may be configured as a device (for example, a heat pump) for removing moisture from air discharged from the first tub 131 and, additionally, for heating the dried air. In some implementations, the first load unit 17 may be constituted by the motor 171, the first heat exchange unit 173, the second heat exchange unit 175, and the fan 177.

In some implementations, the duct 15 includes a first duct for supplying the heated air into the first tub 131 and a second duct for discharging the air in the first tub 131 out of the first cabinet, and the second heat exchange unit 175 (for example, a heat pump or a heater for emitting heat when electric power is supplied thereto) may be provided in the first duct, and the fan 177 may be provided in the second duct.

The operation of the first load unit 17 is controlled by a first control unit 18. Electric power is supplied to the first load unit 17 and the first control unit 18 via a first electric power cable 19.

The second treatment device 3 includes a second cabinet 31 located under the first cabinet 11 for supporting the first treatment device 1 and a second receiving unit 33 defined in the second cabinet 31 for providing a laundry receiving space.

The second receiving unit 33 may include a second tub 331 removably provided in the second cabinet 31 and a second drum 333 provided in the second tub 331 for receiving laundry.

In some implementations, the second treatment device 3 is a configured as a laundry washing machine, and the second tub 331 may be configured to store water.

In the second tub 331 may be provided a heater 353 for heating water (a device for emitting heat when electric power is supplied thereto). Outside the second tub 331 may be provided a driving unit 351 for rotating the second drum 333.

In some implementations, a load (a second load unit) 35 of the second treatment device 3 may be constituted by the driving unit 351 and the heater 353. The operation of the second load unit 35 is controlled by a second control unit 38. Electric power is supplied to the second load unit 35 and the second control unit 38 via a first electric power cable 39.

Electric power is supplied to the first treatment device 1 and the second treatment device 3 via the electric power control device 5. The electric power control device 5 is a device that notifies at least one selected from between the first control unit 18 and the second control unit 38 whether the amount of current per unit time that is supplied to the first treatment device 1 is equal to or greater than a predetermined reference current amount.

Elements that are directed by the electric power control device 5 to control the amount of current per unit time that is supplied to the laundry treatment apparatus may be determined based on the laundry treatment capacities of the respective treatment devices 1 and 3 or the importance of a laundry treatment cycle (or a laundry treatment course) that is being executed by each treatment device.

In FIG. 1, it is assumed that the laundry treatment capacity of the first treatment device 1 is greater than that of the second treatment device 3. In the following description, it is assumed that the electric power control device 5 notifies the second control unit 38 that it is necessary to control the amount of current that is supplied to the second load unit 35.

The electric power control device 5 may include an input unit 52 for receiving electric power from a power supply 7, a first attachment and detachment unit 53, to which the first electric power cable 19 is removably coupled, for electrically connecting the first electric power cable 19 to the input unit 52, a second attachment and detachment unit 54, to which the second electric power cable 39 is removably coupled, for electrically connecting the second electric power cable 39 to the input unit 52, and electric power control units 55, 57, 591, and 593 for notifying the second treatment device 3 that the amount of current per unit time supplied to the first treatment device 1 has reached the reference current amount, when the amount of current per unit time supplied to the first treatment device 1 has reached the reference current amount, such that the second control unit 38 can control the operation of the second load unit 35.

The electric power control device 5 may be removably provided at the power supply 7. Alternatively, the electric power control device 5 may be fixedly provided at the power supply 7. In the former case, a housing 51, to which the input unit 52 is fixed, may be removable from the power supply 7. In the latter case, the housing 51 may be fixed in a room 9, and therefore the power supply 7 may be the input unit 52.

The first attachment and detachment unit 53 may include first connection cables 531a and 531b for connecting pins provided in the first electric power cable 19 to pins of the input unit 52. The first attachment and detachment unit 53 may be provided in the housing 51.

The second attachment and detachment unit 54 may include second connection cables 541a and 541b for connecting pins provided in the second electric power cable 39 to the pins of the input unit 52. The second attachment and detachment unit 54 may be provided in the housing 51. In some implementations, the second connection cables 541a and 541b may diverge from the first connection cables 531a and 531b, respectively.

The electric power control units may include a sensing unit 55 for measuring the amount of current per unit time that is supplied to the first attachment and detachment unit 53, a control unit 57 for determining whether the amount of current per unit time measured by the sensing unit 55 is equal to or greater than the reference current amount, and a communication unit for transmitting a signal indicating whether the amount of current per unit time that is supplied to the first attachment and detachment unit 53 is equal to or greater than the reference current amount to the second treatment device 3.

The communication unit may communicate with the second treatment device 3 in a wired communication fashion. Alternatively, the communication unit may communicate with the second treatment device 3 in a wireless communication fashion.

In the former case, the communication unit may include a communication cable for directly connecting the control unit 57, which is provided in the electric power control device 5, with the second control unit 38, which is provided in the second treatment device 3. In the latter case, the communication unit may include a first communication unit 591 connected to the control unit 57 and a second communication unit 593 connected to the second control unit 38.

In any case, when the second communication unit 593 receives a signal transmitted by the first communication unit 591, the second control unit 38 may temporarily interrupt the overall operation of the second load unit 35, or may interrupt the operation of some of the loads constituting the second load unit 35.

The power supply 7, which is located in the room, is generally connected to an electric power cutoff device, which is configured to interrupt the supply of electric power to the power supply 7, when the amount of current per unit time that is supplied to electric home appliances through the power supply 7 exceeds a predetermined value, thereby preventing the occurrence of a fire. In a general laundry treatment apparatus, therefore, electric power from the power supply 7 may not be supplied to the input unit 52 due to the electric power cutoff device when the first load unit 17 and the second load unit 35 are simultaneously operated.

If the supply of electric power to the input unit 52 is interrupted during the operation of the first treatment device 1 and the second treatment device 3, the operation of both the first treatment device 1 and the second treatment device 3 is interrupted. For this reason, it is necessary to operate only one selected from between the first treatment device 1 and the second treatment device 3, which is inconvenient. Furthermore, the laundry treatment course that was being performed before the supply of electric power is interrupted must be commenced again from the beginning.

In some implementations, the electric power control device 5 may control the second load unit 35 in order to reduce the amount of current per unit time that is supplied to the second treatment device 3, when the amount of current per unit time supplied to the first treatment device 1 has reached the reference current amount during the simultaneous operation of the first treatment device 1 and the second treatment device 3, such that the laundry treatment course that is being performed by the first treatment device 1 can be completed.

For example, in some implementations the first treatment device 1 is performing a laundry treatment course using the first heat exchange unit 173 or the second heat exchange unit 175 and the second treatment device 3 is performing a laundry treatment course using the heater 353, and the amount of current per unit time that is supplied to the laundry treatment apparatus 100 through the power supply 7 may reach a level at which the electric power cutoff device can operate. This is because loads provided in the laundry treatment apparatus 100 that require the greatest amount of current are heat exchange units.

When the reference current amount is set to a value between the amount of current per unit time that is necessary to operate at least one selected from between the first heat exchange unit 173 and the second heat exchange unit 175, provided in the first treatment device 1, and the amount of current per unit time that is necessary to operate the electric power cutoff device, therefore, it may be possible for the laundry treatment apparatus 100 to prevent the operation of the first treatment device 1 and the second treatment device 3 from being simultaneously interrupted.

In some implementations, the sensing unit 55 is provided in order to measure the amount of current per unit time that is supplied to the first treatment device 1 on the assumption that, in a case in which the laundry treatment capacity of the first treatment device 1 is greater than that of the second treatment device 3, as previously described, a laundry treatment course that is performed by the first treatment device 1 has priority over a laundry treatment course that is performed by the second treatment device 3.

Consequently, the sensing unit 55 may be provided in order to measure the amount of current per unit time that is supplied to the second treatment device 3, the control unit 57 may be provided in order to notify the first control unit 18 that the amount of current per unit time that is supplied to the second treatment device 3 is equal to or greater than the reference current amount when the amount of current per unit time that is supplied to the second treatment device 3 is equal to or greater than the reference current amount, and the first control unit 18 may be provided in order to control the first load unit 17 in order to reduce the amount of current per unit time that is supplied to the first load unit 17.

Furthermore, when the sum of the amount of current per unit time that is supplied to the first treatment device 1 and the amount of current per unit time that is supplied to the second treatment device 3 is equal to or greater than the reference current amount, the sensing unit 55 may notify at least one selected from between the first control unit 18 and the second control unit 38 that the sum of the amount of current per unit time that is supplied to the first treatment device 1 and the amount of current per unit time that is supplied to the second treatment device 3 is equal to or greater than the reference current amount. In some implementations, the sensing unit 55 may be provided at a position at which it is possible to measure the amount of current per unit time that is supplied to the first attachment and detachment unit 53 and the amount of current per unit time that is supplied to the second attachment and detachment unit 54.

In some implementations, if the operation of one selected from between the first treatment device 1 and the second treatment device 3, which are operating, is interrupted by the electric power control device 5, a user may suspect that the device that stopped operating has broken down.

In order to prevent the operation of both the two treatment devices 1 and 3 from being interrupted, therefore, it is necessary to make the user recognize that the second treatment device 3 has been interrupted or has changed the laundry treatment course. To this end, the electric power control device 5 may be further provided with a display unit 58 for indicating that the second treatment device 3 has changed the laundry treatment course when the second treatment device 3 has changed the laundry treatment course.

The display unit 58 may indicate on the outside that the laundry treatment course that was being performed by the second treatment device 3 has been changed in order to prevent the occurrence of an accident due to overcurrent. That is, the display unit 58 may include a first display unit 581 for emitting light when the second treatment device 3 is treating laundry without any change in the laundry treatment course and a second display unit 583 for emitting light when the laundry treatment course of the second treatment device 3 has been changed.

In FIG. 1, the control unit 57 of the electric power control device 5 and the second control unit 38 of the second treatment device 3 are provided separately from each other, one selected from between the control unit 57 and the second control unit 38 may be omitted. That is, the control unit 57 may be configured so as to function as the second control unit 38, or the second control unit 38 may be configured so as to function as the control unit 57.

In some implementations, the electric power control device 5 is provided separately from the laundry treatment apparatus 100, the electric power control device 5 may be mounted in the laundry treatment apparatus 100.

In some implementations, the laundry treatment apparatus 100 may be configured such that the first control unit 18 and the second control unit 38 directly communicate with each other and such that the sensing unit 55 for measuring the amount of current per unit time that is supplied to the laundry treatment apparatus 100 may be provided in one selected from between the first treatment device 1 and the second treatment device 3.

FIG. 2 illustrates an example control method of an example laundry treatment apparatus.

The control method may be commenced by the user supplying electric power to the laundry treatment apparatus 100 and inputting at least one selected from among a plurality of laundry treatment courses (hereinafter, courses) set in the respective treatment devices 1 and 3 to the respective treatment devices 1 and 3.

The courses set in the respective treatment devices 1 and 3 may be input to the respective treatment devices 1 and 3 through a control command input unit, such as a control panel.

In some implementations, each course may include one or more cycles that are coupled to each other in a time series fashion. Each cycle means a time series control signal that the control units 18 and 38 transmit to the first load unit 17 and the second load unit 35, respectively, in order to supply air (or moisture) to laundry, or a time series control signal that the control units 18 and 38 transmit to the first load unit 17 and the second load unit 35, respectively, in order to rotate the drums 133 and 333, in which the laundry is received.

For example, it is assumed that a certain course set in the first treatment device 1 includes a process of supplying wash water into the first tub 131, a process of rotating the first drum 133, and a process of draining the wash water from the first tub 131. In some implementations, the course may include a water supply cycle for supplying wash water into the first tub 131, a foreign matter removal cycle for rotating the first drum 133, and a drainage cycle for draining the wash water from the first tub 131.

When courses to be performed by the respective treatment devices 1 and 3 are input to the respective treatment devices 1 and 3, the laundry treatment apparatus sets a performance time for each course. The course time set for each course may be determined based on the course input into each of the treatment devices and the weight of laundry to be treated by the respective treatment devices (the weight of laundry received in the respective drums).

In some implementations, the course time means the execution time of each cycle constituting the course or the sum of the execution times of the cycles constituting the course. Therefore, the respective treatment devices 1 and 3 setting the course time means that the respective treatment devices 1 and 3 set the execution time of unit cycles constituting each course (hereinafter, referred to as reference time).

When courses are input to the respective treatment devices 1 and 3, therefore, the control method performs a step (S1) of setting a reference time T1 of a cycle (a first cycle) to be executed by the first treatment device 1 and a reference time T2 of a cycle (a second cycle) to be executed by the second treatment device 3.

When the reference time of the first cycle (a first cycle of the first treatment device) and the reference time of the second cycle (a first cycle of the second treatment device) are set, the control method performs a step (S2) of commencing the operation of the respective treatment devices 1 and 3.

The step of commencing the operation of the respective treatment devices 1 and 3 may include a first step (S21) of supplying electric power to the first load unit 17 of the first treatment device 1 such that the first treatment device 1 executes the first cycle and a second step (S23) of supplying electric power to the second load unit 35 of the second treatment device 3 such that the second treatment device 3 executes the second cycle. The first step (S21) and the second step (S23) may be commenced simultaneously. Alternatively, one selected from between the first step (S21) and the second step (S23) may be commenced earlier than the other.

In some implementations, electric power may be simultaneously supplied to the first load unit 17, which performs the first step (S21), and the second load unit 35, which performs the second step (S23), irrespective of when the first step (S21) and the second step (S23) are commenced. Consequently, the control method performs a step (S3) of determining whether the amount of current per unit time that is supplied to the laundry treatment apparatus 100, which is measured using the sensing unit 55, is equal to or greater than the predetermined reference current amount.

Whether the amount of current per unit time that is supplied to the laundry treatment apparatus 100 is equal to or greater than the reference current amount may be determined by comparing the sum of the amounts of current per unit time that are supplied to the respective treatment devices with the reference current amount, as previously described, or by comparing the amount of current per unit time that is supplied to one of the treatment devices 1 and 3 with the reference current amount.

In some implementations, the reference current amount may be set to a value that is less than the amount of current that is necessary to operate the electric power cutoff device, which interrupts the supply of electric power to the power supply 7.

In some implementations, the reference current amount may be set to the amount of current that is necessary to operate one selected from among the loads constituting the first load unit 17 or the second load unit 35 that requires the greatest amount of current per unit time. This is because the electric power cutoff device may operate when the load that requires the greatest amount of current per unit time is operated.

In general, the first heat exchange unit 173 or the second heat exchange unit 175, which constitutes the first load unit 17, requires the greatest amount of current per unit time, and the heater 353, which constitutes the second load unit 35, requires the greatest amount of current per unit time.

When the amount of current per unit time that is supplied to the first treatment device is compared with the reference current amount in step S3, therefore, the reference current amount may be set to the amount of current per unit time to be supplied to each heat exchange unit in order to operate the first heat exchange unit 173 or the second heat exchange unit 175.

When the amount of current per unit time that is supplied to the second treatment device is compared with the reference current amount in step S3, the reference current amount may be set to the amount of current per unit time to be supplied to the heater 353 in order to operate the heater 353.

In some implementations, upon determining that the amount of current per unit time supplied to the laundry treatment apparatus 100 has reached the reference current amount, the control method performs a third step (S4) of maintaining the first cycle of the first treatment device, terminating the second cycle of the second treatment device, and executing a third cycle (another cycle of the second treatment device other than the second cycle).

In the third step (S4), the control unit 57 notifies the second control unit 38 that it is necessary to control the amount of current per unit time that is supplied to the second load unit 35, and the second control unit 38 controls the second load unit 35 in response to a signal from the control unit 57 such that the second treatment device executes the third cycle.

In some implementations, the third cycle (a second cycle of the second treatment device) may be set as a cycle that requires a lower amount of current per unit time than that necessary to execute the second cycle (a first cycle of the second treatment device). For example, in a case in which the second cycle is a cycle using the heater 353, the third cycle may be set as a cycle not using the heater 353.

When the amount of current per unit time supplied to the laundry treatment apparatus 100 has reached the reference current amount, the cycle of the second treatment device is switched (the contents of the course input to the second treatment device are changed) in order to reduce the amount of current per unit time that is supplied to the laundry treatment apparatus 100, thereby preventing the operation of both the first treatment device 1 and the second treatment device 3 from being interrupted by the electric power cutoff device.

In some implementations, in order to prevent the interruption of electric power supplied to both the first treatment device 1 and the second treatment device 3, the supply of electric power to the second treatment device 3 may be interrupted. In some implementations, the second cycle of the second treatment device 3 must be resumed after the first cycle of the first treatment device 1 is terminated, with the result that the operation time of the laundry treatment apparatus 100 may be increased (the amount of electric power that is used may be increased).

In some implementations the operation of the second treatment device 3 is maintained by switching from the second cycle to the third cycle of the second treatment device 3 without interrupting the supply of electric power to the second treatment device 3, and the laundry received in the second treatment device 3 may be treated (for example, washed or dried) through the third cycle. Therefore, even when the time necessary to execute the second cycle, which is resumed after the first cycle of the first treatment device 1 is terminated, is reduced, it may be possible to wash or dry the laundry to a desired extent.

During the execution of the first cycle of the first treatment device 1 and the third cycle of the second treatment device 3 (S4), the control method performs a step (S5) of determining whether the execution time of the first cycle has exceeded a predetermined reference time T1 set for the first cycle of the first treatment device 1. That is, it is periodically determined whether the sum of the time (t11) for which the first step (S21) was performed and the time (t13) for which the third step (S4) was performed has reached the first cycle reference time T1.

When the time (t11+t13) for which the first cycle of the first treatment device was operate reaches the second cycle reference time T1 (S5) during the performance of the third step (S4), a fourth step (S6) of terminating the operation of the first treatment device is performed.

When the operation of the first treatment device is terminated as the result of performing the fourth step (S6), a fifth step (S7) of terminating the third cycle of the second treatment device (e.g., terminating the third step) and resuming the second cycle of the second treatment device is performed.

During the performance of the fifth step, it is determined whether the time (t25) for which the second cycle was continuously executed has reached a predetermined reference time T2 set for the second cycle of the second treatment device (S8), and, if so, the second cycle of the second treatment device is terminated (S9).

In some implementations, since the laundry received in the second treatment device is continuously treated even during the third cycle of the second treatment device, as previously described, the fifth step (S7) may be performed until the sum (t21+t25) of the time for which the second cycle was executed in the second step (S23) and the time for which the second cycle was executed in the fifth step (S7) reaches a modified reference time T2+x.

The modified reference time T2+x is a time obtained by adding an additional time x to the second cycle reference time T2 set before commencement of the second step (S23).

The additional time x is added to the second cycle reference time T2 in order to prevent the occurrence of a problem whereby laundry is not treated (for example, washed or dried) to a desired extent as the result of the second cycle of the second treatment device not being continuously executed for the second cycle reference time T2.

In some implementations the second cycle of the second treatment device is a cycle for washing laundry with water heated using the heater 353, and heat is not continuously supplied to the laundry received in the second treatment device 3 for the second cycle reference time T2 but is discontinuously supplied to the laundry received in the second treatment device 3 in the second step (S23) and the fifth step (S7). As a result, the temperature of the water supplied to the second treatment device may not increase to a temperature necessary to execute the second cycle.

The additional time x is provided in order to minimize this phenomenon. In some implementations the fifth step (S7) is performed for the modified reference time T2+x, and it is possible to heat the water stored in the second tub 331 for a longer time, thereby minimizing the above problem.

The additional time x may be set so as to increase in proportion to the time for which the third step was performed (the time for which the third cycle of the second treatment device was executed) (t23). Alternatively, the additional time x may be set so as to be inversely proportional to the time for which the second step was performed (the time for which the second cycle of the second treatment device was executed) (t21).

In some implementations, when the amount of current per unit time that is supplied to the laundry treatment apparatus 100 is equal to or greater than a reference amount of current, the cycle of the second treatment device 3 is switched from the cycle that is currently being executed to another cycle. In some implementations, the laundry treatment apparatus 100 may be controlled such that the cycle of the first treatment device 1 is switched from the cycle that is currently being executed to another cycle.

In the above control method, it is possible to prevent the operation of the two treatment devices 1 and 3 from being simultaneously terminated and to prevent an excessive increase in the time for which the treatment device, the course for which has been changed, is operated.

In some implementations, the first treatment device executes the first cycle, and the second treatment device executes the second cycle. According to circumstances, the third cycle may be executed instead of the second cycle. However, the terms "first cycle" and "second cycle" are used only to distinguish between the cycle that is executed by the first treatment device and the cycle that is executed by the second treatment device, and do not indicate the sequence in which the two cycles are executed.

In addition, the terms "second cycle" and "third cycle" are used only to indicate that the second cycle and the third cycle are different cycles that are executed by the second treatment device, and do not indicate the sequence in which the two cycles are executed.

FIG. 3 illustrates an example control method of an example laundry treatment.

A description will be given of an example of a process in which the laundry treatment apparatus 100 is controlled when a control command is input to the laundry treatment apparatus 100 such that the first treatment device 1 sequentially executes the first cycle and the fourth cycle and the second treatment device executes the second cycle.

The control method includes a step (S1) of inputting courses of the respective treatment devices 1 and 3 and setting reference times of cycles constituting each of the input courses.

The reference time setting step (S1), which is provided to determine when each cycle is terminated, may include a step of setting a reference time T1 of the first treatment device and a reference time T2 of the second treatment device. The reference time T1 of the first treatment device may be configured to set a reference time T11 of a first cycle that is executed by the first treatment device and a reference time T12 of a fourth cycle that is executed by the first treatment device, and the reference time T2 of the second treatment device may be set as a reference time T2 of a second cycle that is executed by the second treatment device.

Subsequently, the control method performs a first step (S21) of commencing the first cycle of the first treatment device, a second step (S23) of commencing the second cycle of the second treatment device, and a step (S3) of determining whether the amount of current per unit time that is supplied to the laundry treatment apparatus 100 is equal to or greater than a predetermined reference amount of current.

The first step (S21) and the second step (S23) may be commenced simultaneously. Alternatively, one selected from between the first step (S21) and the second step (S23) may be commenced earlier than the other. That is, the first step (S21) and the second step (S23) may be commenced simultaneously or sequentially as long as a period during which electric power is supplied to the first load unit in the first step and a period during which electric power is supplied to the second load unit in the second step overlap each other.

Upon determining that the amount of current per unit time supplied to the laundry treatment apparatus 100 has reached the reference amount of current, the control method performs a third step (S4) of controlling the first treatment device to execute the first cycle and controlling the second treatment device to execute a third cycle after terminating the second cycle.

During the performance of the third step, it is determined whether the time (t11+t13) for which the first cycle of the first treatment device was executed has reached the first cycle reference time T11.

Upon determining that the time (t11+t13) for which the first cycle was executed has not reached the first cycle reference time T11, a fourth step (S6) of terminating the first cycle is performed.

When the first cycle of the first treatment device is terminated (S6), a fifth step (S73) of terminating the third cycle and executing the second cycle of the second treatment device 3 is performed, and a sixth step (S71) of executing the fourth cycle of the first treatment device 1 is performed.

During simultaneous execution of the fourth cycle of the first treatment device and the second cycle of the second treatment device (S7), it is periodically determined whether the amount of current per unit time that is supplied to the laundry treatment apparatus 100 is equal to or greater than the reference current amount (S80).

Upon determining that the amount of current per unit time supplied to the laundry treatment apparatus 100 has exceeded the reference current amount during simultaneous execution of the fifth step (S73) and the sixth step (S71), a seventh step (S91) of maintaining the fourth cycle of the first treatment device and performing switching from the second cycle to the third cycle of the second treatment device is performed.

When the time (t15+t17) for which the fourth cycle of the first treatment device was executed has reached the fourth cycle reference time T12 (S93) during the performance of the seventh step (S91), an eighth step (S95) of terminating the fourth cycle of the first treatment device is performed.

In some implementations, when the fourth cycle of the first treatment device is terminated as the result of performing the eighth step (S95), a ninth step (S97) of executing the second cycle of the second treatment device is performed. The ninth step (S97) is performed until the time (t29) for which the second cycle of the second treatment device has been continuously executed reaches the second cycle reference time T2 (S99).

Alternatively, the ninth step (S97) may be performed until the sum (t21+t25+t29) of the time for which the second cycle was executed in the second step (S23), the fifth step (S73), and the ninth step (S97) reaches the modified second cycle reference time T2+x.

The additional time x may be set so as to be proportional to one selected from between the time (t23) for which the third step was performed and the time (t27) for which the seventh step was performed. Alternatively, the additional time x may be set so as to be proportional to the sum (t23+t27) of the time for which the third step was performed and the time for which the seventh step was performed.

In addition, the additional time x may be set so as to be inversely proportional to one selected from between the time (t21) for which the second step was performed and the time (t25) for which the fifth step was performed. Alternatively, the additional time x may be set so as to be inversely proportional to the sum (t21+t25) of the time for which the second step was performed and the time for which the fifth step was performed.

The additional time x may be set so as to increase in proportion to the time for which the second cycle was delayed (the time for which the third cycle was executed). The longer the time for which the second cycle was executed is, the smaller the additional time x is set to be, in order to achieve desired effects through the second cycle using the minimum amount of electric power.

In some implementations, when the amount of current per unit time that is supplied to the laundry treatment apparatus does not exceed the reference current amount even though the fifth step and the sixth step are simultaneously performed (S7), the sixth step (S71) is terminated when the time (t15) for which the fourth cycle of the first treatment device was executed has reached the fourth cycle reference time T12 (S81 and S83), and the fifth step (S73) is terminated when the time (t25) for which the second cycle of the second treatment device was continuously executed has reached the second cycle reference time T2 (S82 and S84).

In some implementations, the fifth step (S73) may be terminated when the sum (t21+t25) of the time for which the second cycle of the second treatment device was executed has reached the modified reference time T2+x. In some implementations, the additional time x may be set so as to increase in proportion to the time for which the third step was performed. Alternatively, the additional time x may be set so as to decrease in proportion to the time for which the second step was performed (e.g., the additional time x may be set so as to be inversely proportional to the time for which the second step was performed).

The fourth cycle of the first treatment device may be identical to the first cycle of the first treatment device. Alternatively, the fourth cycle of the first treatment device may be different from the first cycle of the first treatment device.

In some implementations, the first cycle and the fourth cycle are different from each other, the first cycle may be a cycle for heating wash water using the first heat exchange unit, and the fourth cycle may be a cycle for heating air using the second heat exchange unit.

In some implementations, the first cycle and the fourth cycle are the same. In some implementations, during the operation of the second treatment device, the supply of electric power to the first treatment device may be interrupted as the result of terminating the cycle that is being executed by the first treatment device, and then the supply of electric power to the first treatment device may be resumed in order to execute the same cycle.

In some implementations, the first treatment device executes the first cycle and the fourth cycle, and the second treatment device executes the second cycle. According to circumstances, the third cycle may be executed instead of the second cycle. However, the terms "first cycle" and "second cycle" are used only to distinguish between the cycle that is executed by the first treatment device and the cycle that is executed by the second treatment device, and do not indicate the sequence in which the two cycles are executed.

In addition, the terms "first cycle" and "fourth cycle" are used to indicate that the first cycle and the fourth cycle are different cycles that are executed by the first treatment device and to distinguish them from the cycle that is executed by the second treatment device, and the terms "first cycle", "second cycle", "third cycle", and "fourth cycle" do not indicate the sequence in which these cycles are executed.

The subject matter described above provides a control method of a laundry treatment apparatus including at least two treatment devices (for example, a dryer, a washer, a washer and dryer, etc.) for treating laundry.

In addition, the subject matter described above provides a control method of a laundry treatment apparatus that is capable of preventing the operation of a first treatment device and a second treatment device for treating laundry from being simultaneously interrupted due to overcurrent even when the two treatment devices are operated simultaneously.

The invention claimed is:

1. A control method of a laundry treatment apparatus comprising a first treatment device that has a first load unit and that is configured to treat laundry and a second treatment device that has a second load unit and that is configured to treat laundry, the control method comprising:
executing a first cycle in the first treatment device by supplying electric power to the first load unit;
while executing the first cycle in the first treatment device, executing a second cycle in the second treatment device by supplying electric power to the second load unit;
based on an amount of current per unit time that is supplied to the laundry treatment apparatus being equal to or greater than a predetermined reference current amount, terminating the second cycle in the second treatment device and executing a third cycle in the second treatment device, the third cycle requiring a lower amount of current per unit time than that necessary to execute the second cycle;

terminating the first cycle in the first treatment device;

terminating the third cycle in the second treatment device and repeating the second cycle in the second treatment device;

terminating the repeated second cycle in the second treatment device based on:

the repeated second cycle in the second treatment device executing for at least a predetermined second cycle reference time;

a sum of an execution time of the second cycle in the second treatment device and an execution time of the repeated second cycle in the second treatment device being equal to or greater than the predetermined second cycle reference time; or the sum of the execution time of the second cycle in the second treatment device and the execution time of the repeated second cycle in the second treatment device being equal to or greater than a sum of a predetermined additional time and the predetermined second cycle reference time.

2. The control method according to claim 1, further comprising setting the predetermined second cycle reference time before executing the second cycle in the second treatment device.

3. The control method according to claim 1, wherein the predetermined additional time is proportional to an execution time of the third cycle in the second treatment device or inversely proportional to an execution time of the second cycle in the second treatment device.

4. The control method according to claim 1, further comprising:

after terminating the first cycle in the first treatment device and while repeating the second cycle in the second treatment device, repeating the first cycle in the first treatment device or executing a fourth cycle that is different from the first cycle in the first treatment device.

5. The control method according to claim 4, further comprising:

based on the amount of current per unit time that is supplied to the laundry treatment apparatus being equal to or greater than the predetermined reference current amount (i) during execution of the repeated second cycle in the second treatment device and (ii) during execution of the repeated first cycle in the first treatment device or execution of the fourth cycle:

terminating the repeated second cycle in the second treatment device; and repeating the third cycle in the second treatment device.

6. The control method according to claim 5, further comprising:

terminating the repeated first cycle in the first treatment device or the fourth cycle; and terminating the repeated third cycle in the second treatment device and executing a second repetition of the second cycle in the second treatment device.

7. The control method according to claim 6, further comprising:

terminating the second repetition of the second cycle in the second treatment device based on the second repetition of the second cycle in the second treatment device executing for at least the predetermined second cycle reference time.

8. The control method according to claim 6, further comprising:

terminating the second repetition of the second cycle in the second treatment device based on a sum of the execution time of the second cycle in the second treatment device, the execution time of the repeated second cycle in the second treatment device, and the execution time of the second repetition of the second cycle in the second treatment device is at least the predetermined second cycle reference time.

9. The control method according to claim 6, further comprising:

terminating the second repetition of the second cycle in the second treatment device based on a sum of the execution time of the second cycle in the second treatment device, the execution time of the repeated second cycle in the second treatment device, and the execution time of the second repetition of the second cycle in the second treatment device is at least a sum of a predetermined additional time and the predetermined second cycle reference time.

10. The control method according to claim 9, wherein the additional time is proportional to one of an execution time of the third cycle in the second treatment device or an execution time of the repeated third cycle in the second treatment device.

11. The control method according to claim 9, wherein the additional time is inversely proportional to one of the execution time of the second cycle in the second treatment device or the execution time of the repeated second cycle in the second treatment device.

12. The control method according to claim 1, wherein the amount of current per unit time that is supplied to the laundry treatment apparatus is an amount of current per unit time that is supplied to the first treatment device.

13. The control method according to claim 12, wherein the reference current amount is one of:

an amount of current per unit time necessary for a first heat exchange unit that is located in the first load unit to heat a fluid, or an amount of current per unit time necessary for a second heat exchange unit that is located in the first load unit to heat a gas.

14. The control method according to claim 1, wherein the amount of current per unit time that is supplied to the laundry treatment apparatus is a sum of an amount of current per unit time that is supplied to the first treatment device and an amount of current per unit time that is supplied to the second treatment device.

15. The control method according to claim 1, wherein the first treatment device is configured to treat a heavier load of laundry than the second treatment device.

16. The control method according to claim 1, wherein the first cycle in the first treatment device and the second cycle in the second treatment device begin execution at different times.

17. The control method according to claim 1, wherein the first cycle in the first treatment device and the second cycle in the second treatment device begin execution simultaneously.

18. The control method according to claim 1, wherein terminating the repeated second cycle in the second treatment device occurs based on the repeated second cycle in the second treatment device executing for at least the predetermined second cycle reference time.

19. The control method according to claim 1, wherein terminating the repeated second cycle in the second treatment device occurs based on the sum of the execution time of the second cycle in the second treatment device and the execution time of the repeated second cycle in the second treatment device being equal to or greater than the predetermined second cycle reference time.

20. The control method according to claim 1, wherein terminating the repeated second cycle in the second treatment device occurs based on the sum of the execution time of the second cycle in the second treatment device and the execution time of the repeated second cycle in the second treatment device being equal to or greater than a sum of the predetermined additional time and the predetermined second cycle reference time.

* * * * *